United States Patent

Chiba et al.

[15] 3,660,619

[45] May 2, 1972

[54] METHOD AND APPARATUS FOR ECHO CANCELLATION IN TELEPHONE NETWORKS UTILIZING TWO-WIRE/FOUR-WIRE EQUIPMENT

[72] Inventors: Seibi Chiba; Tadahiro Sekimoto, both of Tokyo, Japan

[73] Assignee: Nippon Electric Company, Limited, Tokyo, Japan

[22] Filed: Nov. 19, 1969

[21] Appl. No.: 877,887

[30] Foreign Application Priority Data

Nov. 21, 1968 Japan....................................43/86006
Jan. 21, 1969 Japan....................................44/4540

[52] U.S. Cl...........................................................179/170.2
[51] Int. Cl...........................................................H04b 3/20
[58] Field of Search..............................................179/170.2

[56] References Cited

UNITED STATES PATENTS

| | | | |
|---|---|---|---|
| 3,465,106 | 9/1969 | Nagata et al. | 179/170.2 |
| 3,499,999 | 3/1970 | Sonohi | 179/170.2 |
| 3,500,000 | 3/1970 | Kelley et al. | 179/170.2 |

*Primary Examiner*—Kathleen H. Claffy
*Assistant Examiner*—William A. Helvestine
*Attorney*—Ostrolenk, Faber, Gerb & Soffen

[57] ABSTRACT

Method and apparatus for cancelling echos in two-wire/four-wire equipment utilized in telephone networks wherein, upon the detection of a non-speech interval, the signal appearing in the sending path of the four-wire circuit is divided by the signal in the receiving path of the four-wire network present at the same time to generate a transfer function. The transfer function is multiplied by the leakage signal in the sending path of the four-wire circuit to form a product. The transfer function (quotient signal) is stored after formation thereof to be utilized during succeeding equally spaced time intervals to form a transfer function during each such time interval, which succeeding transfer functions are stored in suitable registers. The signal in the receiving path is coupled to a multi-tapped delay line, wherein it is utilized to form a product with each of the transfer functions so formed and associated with each output of the multi-tapped delay line. All of the products are summed to form a resultant signal which is subtracted in a different circuit which receives the leakage signal in the sending path of the four-wire network to initially provide the signal utilized to form the transfer functions at each of the equally spaced time intervals and which is ultimately utilized to subtract the leakage signal from the signal appearing in the sending path of the four-wire circuit to cancel talkers' echo.

5 Claims, 4 Drawing Figures

Figure 1:
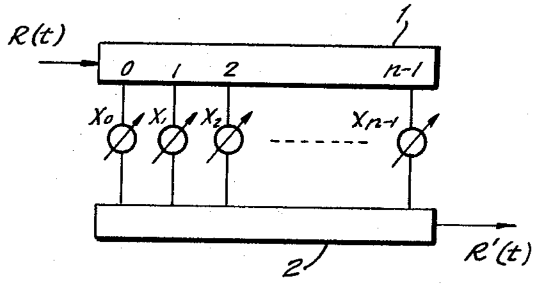

INVENTORS
SEIBI CHIBA
TADAHIRO SEKIMOTO
BY
Ostrolenk, Faber, Gerb & Soffen
ATTORNEYS INVENTORS
SEIBI CHIBA
TADAHIRO SEKIMOTO
BY
Ostrolenk, Faber, Gerb & Soffen
ATTORNEYS

METHOD AND APPARATUS FOR ECHO CANCELLATION IN TELEPHONE NETWORKS UTILIZING TWO-WIRE/FOUR-WIRE EQUIPMENT

The present invention relates to echo suppressors and more particularly to echo suppressors of the cancellation type wherein computations are carried out in a sequential fashion to produce the desired cancelling signal for suppression of the echo or leakage signal.

Echo cancellers of the prior art are typically operated in such a manner that the echo due to the presence of an undesirable signal occurring as a result of leakage in the system from the receiving side to the sending side of a four-wire circuit utilized in two-wire/four-wire convertors (said convertors hereinafter being referred to as "hybrids") is cancelled through an arrangement wherein a circuit network having the same transfer characteristics as the leakage path is formed, thereby synthesizing from the receiving signal the same signal waveform as the leakage signal. The synthesized signal is subtracted from the sending side signal to cancel the leakage signal component present in the sending side signal.

Since the transfer characteristics of the leakage path are considered to be linear in most cases, the transfer characteristics can take the form of a circuit known as the transversal filter in which each tap or output of a multitapped delay line is multiplied by a suitable coefficient (hereinafter referred to as "tap gain") wherein the plurality of multiplied results formed from each output are summed to deliver a resultant signal as the output signal.

In this case, the impulse response of the transversal filter is equal to the set of presently selected tap gain values. Hence, in accordance with prior art techniques, a circuit network having the same transfer characteristics as the leakage path is formed by application of an impulse from the receiving side of the hybrid, detecting the resultant response occurring on the sending side through the leakage path, and directly setting the sampled values of detected signal as the "tap gains" of the transversal filter. In accordance with this arrangement, however, the tap gain cannot be varied automatically in cases where the transfer characteristics of the leakage path may vary. Such changes or variations may, for example, be due to an extension connection on the subscriber's side which occurs after a tap gain has once been set. Such occurrences make it difficult to maintain the desired echo-cancelling effect.

In accordance with the present invention, during those periods in which no voice signal is detected on the sending side path of the four-wire circuit of the subscriber, the tap gains of the transversal filter are calculated and then set by the use of the receiving side signal present in the receiving path of the hybrid of said subscriber and the sending side leakage signal so that the transfer characteristics of the transversal filter are made equal to that of the leakage path. It, therefore, is rather simple to provide a transversal filter which automatically varies the characteristics of the circuit network according to the variations in the transfer characteristics of the leakage path without the need for generating impulses and inserting impulses into the system while retaining the desirable cancellation characteristics.

In the present invention, during periods in which no voice signal occurs on the sending side path of the four-wire circuit of the subscriber, the leakage signal appearing in the send path of the four-wire circuit of said subscriber due to the input signal in the receiving path thereof is simultaneously applied to the transversal filter and to a divider circuit. The output of the first tap of the transversal filter delay line is developed at the output of a summing circuit where it is then subtracted from this signal level in the receive path of the four-wire circuit. The resultant signal appearing at the output of the difference circuit is then divided by the leakage signal to generate a first transfer function which is then utilized to set the first gain. Each succeeding tap gain associated with each succeeding tap of the multi-tap delay line is set in a similar manner until all tap gains have been set. This system permits sequential solution of a complex circuit represented by a large number of simultaneous equations to be solved in sequential fashion reducing the computational equipment required to a single summing circuit, a single difference circuit, a single dividing circuit, and in one preferred embodiment, a plurality of multiplier circuits equal in number to the total number of taps provided in the multitap delay line which forms the transversal filter.

It is therefore one object of the present invention to provide a novel echo cancelling circuit including means for performing computations to set tap gains wherein the computations per tap of the transversal filter may be performed in sequential fashion thereby greatly reducing the computational equipment required while nevertheless retaining the desirable characteristic of achieving good echo cancellation.

Figure 2:
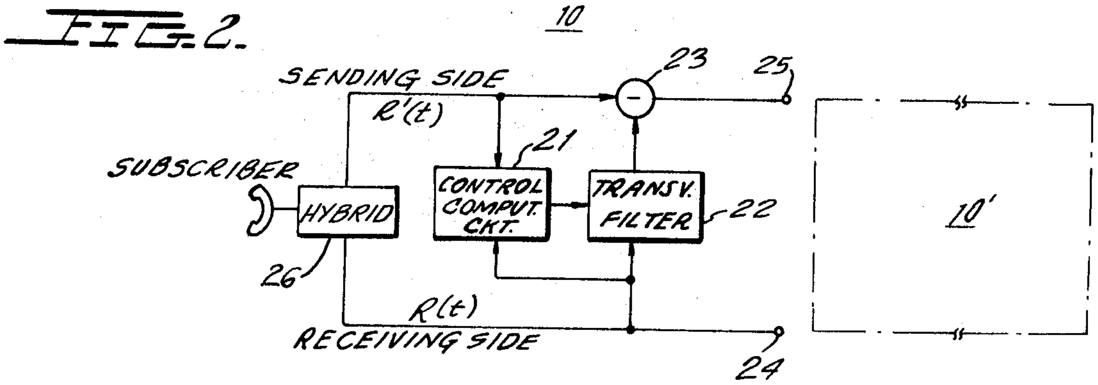
Figure 3:
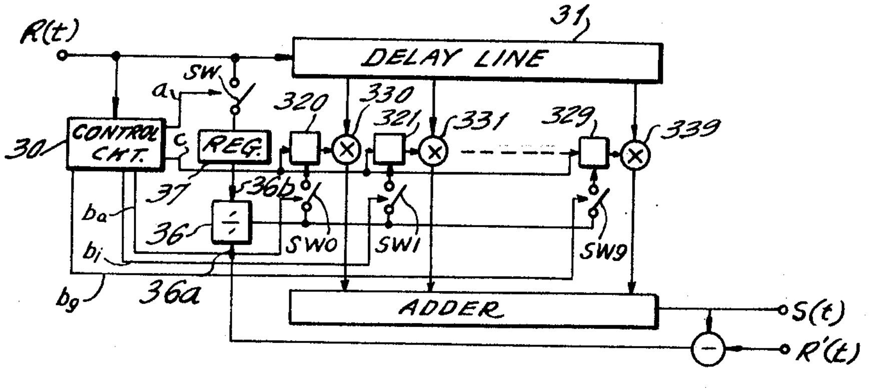
Figure 4:
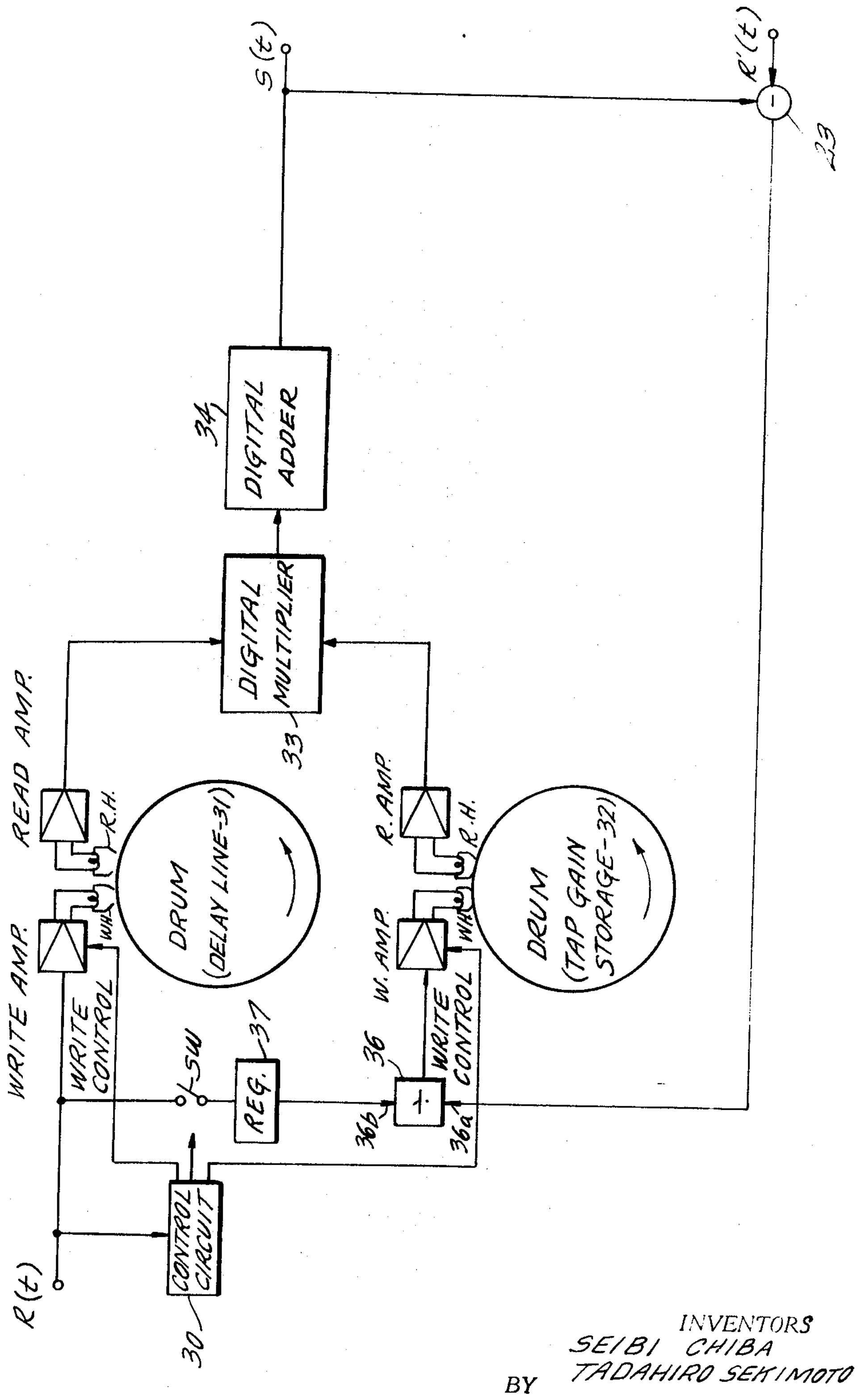

These as well as other objects of the present invention will become apparent when reading the accompanying description and drawings in which:

FIG. 1 is a block diagram showing the principles of the present invention;

FIG. 2 is a block diagram showing an echo cancellation system incorporating the principles of the present invention and showing the manner in which such equipment is electrically interfaced with two-wire/four-wire equipment utilized in telephone networks; and FIG. 3 is a block diagram showing a transversal filter of the type shown in FIG. 1 and further incorporating the computational and control capabilities shown in simplified fashion in FIG. 2;

FIG. 4 is a block diagram showing an alternative embodiment of the invention which may be substituted for the system of FIG. 3.

In accordance with the present invention, the following principle is employed to calculate and set the tap gains of a transversal filter through the use of the receiving signal and the leakage signal appearing in the receive and send paths, respectively, of a four-wire circuit.

As shown in FIG. 1, an input signal $R(t)$ is applied to a transversal filter which is comprised of a multi-tap delay line 1 having $n$ taps or outputs. In the example given in FIG. 1, the output signal $R'(t_0)$ developed at the output of an adder or summing circuit 2 is expressed by the following equation:

$$R^1(t_o)=R(t_o)X_o+R(t_{-1})X_1+\ldots+R(t_{-(n-1)}X_{n-1} \quad (1)$$

where $R(t_o)$: value of $R(t)$ of $0^{th}$ tap at time $t_o$ $R(t_{-1})$: value of $1^{st}$ tap at time $t_o$ $R(t_{-(n-1)})1$ : value of $(n-1)^{st}$ tap at time $t_o$ $X_0, X_1, \ldots$: tap gains When the tap interval of the delay line is assumed to be $T$, the output signal $R'(t_1)$ at time $t_1=t_o+T$ will be:

$$R'(t_1)=R(t_1)X_0+R(t_o)X_1+\ldots+R(T_{2-n})X_{n-1} \quad (2)$$

Rearranging equation (2) for each time $t_o$ to $t_{n-1}$, yields a group of $n$ equations. These equations represent a simultaneous linear equation system with $n$unknowns ($X_0, X_1, \ldots X_{n-1}$) when $R(t)$ and $R'(t)$ are known, from which the unique and desired solutions are found. Therefore, it is theoretically possible to obtain the values of the total number $n$ of tap gains $X_0, X_1, \ldots X_{n-1}$ by solving the equations, for example, by using a suitable computing device.

Substituting $R(t)$ by the value of the signal in the receiving in side of hybrid, and $R'(t)$ by the leakage signal value on the sending side, the calculated solution of the transfer characteristics of the transversal filter will be equal to that of the leakage path. Hence, by subtracting this output from the signal on the sending side, the leakage signal component can be exactly cancelled.

But since $n$ is typically more than 100 a comparatively large, high speed electronic computer is necessary to solve such a simultaneously linear equation system with $n$-unknowns.

In accordance with the present invention, the multiplication operation between the outputs at each tap and their associated tap gain, and the addition of the products so formed, which operations are inherent in transversal filters (hereinafter referred to as T.F.) are actively used on a real-time basis wherein the simultaneous linear equation system is solved in a sequential fashion in accordance with the given input and output signals present during the real-time computations being performed. In addition thereto, the sequential computation approach may be done in a greatly simplified and straightforward manner requiring provision of only an adder and a divider circuit (or capability) in addition to the transversal filter structure.

As has been described above, a simultaneous linear equation system with $n$-unknowns may be expressed as follows:

$$\left.\begin{aligned} &R(t_0)X_0+R(t_{-1})X_1+.....+R(t_{1-n})X_{n-1}=R'(t_0)\\ &R(t_1)X_0+R(t_0)X_1+.....+R(t_{2-n})X_{n-1}=R'(t_1)\\ &\quad\cdot \qquad \cdot \qquad \cdot\\ &\quad\cdot \qquad \cdot \qquad \cdot\\ &R(t_{n-1})X_0+R(t_{n-2})X_1....+R(t_0)X_{n-1}=R'(t_{n-1}) \end{aligned}\right\} \quad (3)$$

where the time interval is determined to be equal to the tap interval of the delay line.

When the input signal is zero before time $t=t_{-1}$, i.e., $R(t_i)=0$ and $i<0$, the portion of the matrix which represents the left-hand sides of the $n-$ simultaneous equations, becomes a trigonometric matrix wherein the elements in the upper right half of the matrix are all zero. Therefore, when the values of $R(t)$ and $R'(t)$ are known, the tap gains $X_0, X_1, \ldots X_{n-1}$ may readily and easily be determined by sequential substitution. In other words, the value of $X_0=R'(t_0)/R(t)$ at time $t=t_0$ is obtained from the relation set forth in the first line or equation of the simultaneous equation system (3) and the value $X_1$ is then obtained by substituting the value of $X_0$ into the second relationship of the simultaneous equation group (3) which represents the status or condition of the circuit at the time $t=t_1$. In a similar manner, all the remaining values between $X_2$ and $X_{n-1}$ may be determined before the time $t_{n-1}$. Thus, the relationships of the equations in the simultaneous equation system (3) at the time $t=t_1$ may be expressed, generally, in the following form:

$$\sum(i-1)+R(t_0)X_i=R'(t_i) \quad (4)$$

where, $$(i-1)=\sum_{k=0}^{i-1}R(t_{i-k})X_k$$

(5)

Therefore, the value of $X_i$ can be calculated from the following equation:

$$X_i=\frac{R'(t_i)-\sum(i-1)}{R(t_0)} \quad (6)$$

The value $\Sigma(i-1)$ is exactly the value of output of the T.F. at the time $t=t_{i-1}$. The $(i-th)$ tap gain $Xi$ is obtained by subtracting the value $\Sigma(i-1)$ from the given output signal $R'(t_i)$, which is the desired final output of T.F. at the time $t=t_i$, and then dividing the resulting difference by the value $R(t_o)$ of the given input signal at $t=t_0$.

The performance of the above operations require only one subtractor and one divider in addition to the operational functions inherent in the T.F.

An embodiment of an echo canceller which utilizes the above mentioned principles will now be explained with reference to FIG. 2 which shows a control/computing circuit 21 employed to recognize those intervals during which no voice signal is transmitted from one subscriber location 10 through the sending side path 25 to another subscribing location 10' which is of similar structure. The sending side signal $R'(t)$ is also sampled at this time in addition to the receiving side signal $R(t)$. The control/computing circuit 21 utilizes these two signals to calculate the tap gains of the transversal filter (T.F.) 22 in accordance with the values of the signal $R(t)$ on the receiving side and the leakage signal $R'(t)$ on the sending side during an interval in which no voice signals are applied to terminal 24. The output of the transversal filter 22 is subtracted from the signal appearing on the sending side of the hybrid circuit 26 by means of a subtractor or difference circuit 23. Thus, the leakage signal portion of the sending side signal $R'(t)$ is effectively cancelled before being applied to the sending terminal 25 for transmission to remote subscriber location 10' when both the speech signal from the subscriber's side and the leakage signal $R'(t)$ have been present on the sending side.

In accordance with the present invention, the tap gains are calculated and set during the time when no speech signals are being sent by the subscriber at location 10. Thus, even if the transfer characteristics of the leakage path are varied, the desired characteristics of echo suppression can be obtained through the automatic following of variations in the transfer characteristics.

A circuit for calculating and setting tap gains in the echo canceller arrangement shown in FIG. 2 will now be described with regard to the arrangement of FIG. 3 showing a block diagram of one preferred embodiment of the present invention.

In this embodiment, the delay line 31 is provided with ten taps arranged at equally spaced intervals along the delay line. The output signals at each of these taps are multiplied by the contents of respective tap gain registers 320–329, respectively, by means of the multipliers 330–339, respectively. The products so formed are summed in adder 34.

Before the initiation of operation, the contents of the tap gain registers 320–329 are cleared through the control line $c$ from the control circuit 30. The control circuit 30 detects the time to when $R(t_o)=0$ while $R(t_i)=0$ at time $t_i$ before time $t_0$. Upon detection of this condition, control circuit 30 operates the control line $a$ to close switch SW in order to store the value of $R(t_0)$ in register 37.

The output of adder 34 is zero at this time so that the signal applied to the input 36a of divider 36 will be $R'(t)-S(t)$ where $S(t)$ equals zero. The contents of register 37 i.e., signal $R(t)$ is applied to input terminal 36$b$ of divider circuit 36 to form the quotient $R'(t_0)/R(t_0)$. This quotient represents the tap gain $X_0$. When the value $X_0$ is thus obtained, a switch $SW_0$ is closed through the control line $b_0$ to store the value of $X_0$ into a tap register 320. At time $t=t_1$ in the sequential operation, the output of adder 34 becomes $R(t_1)X_0$. The value of $R'(t_1)$ minus $R(t_1)X_0$ is then divided by $R(t_0)$ to form a quotient which now represents the desired value of $X_1$. This value is now stored in a tap register 321 by closing switch SW1 through the control line $b_1$. It should be understood that switch $SW_0$ which was previously closed, is operated to the closed position only during that period of time sufficient to transfer the quotient $X_0$ to register 320 and thus only one of the switches SWO–SW9 is closed at any given instant to be assured of the fact that the quotient formed at any given time is transferred to the proper register. Thus, the output of adder 34 at time $t=t_i$ will be equal to $\Sigma(i-1)$ which represents one term in the numerator of equation (6).

This value is then subtracted from the signal $R'(t_i)$ and the resulting difference is then divided by the signal $R(t_0)$. The quotient appearing at the output of divider 36 is then equal to the value $X_i$ as shown in equation (6). By closing the switch $SW_i$ at this time, the value of the corresponding tap gain $X_i$ is stored in tap gain register 32($i$). When the values of the tap gains $X_0$–$X_9$ (in the embodiment of FIG. 3) are stored in their corresponding tap gain registers 320–329, respectively, a 10th order transversal filter having a transfer function determined by the given output signals $R(t)$ and $R'(t)$ is completed.

It can be seen from the foregoing description that the present invention teaches a novel echo cancellation device capable of completely eliminating talker's echo through the generation of a cancellation signal developed through the use of a transversal filter and extremely simplified computational means to perform sequential solution of the simultaneous equations representing the transfer function.

The above description sets forth a solution for obtaining the desired echo cancellation through the use of analog type transversal filter circuits. However, it should be noted that circulating memories may be used as both the tapped delay line and the tap gain registers, in which signals are employed as the input and output signals and the output of a high speed digital delay line is fed back to the input side thereof. In this circuit configuration, since the multiplication of each memory and tap gain is carried out on a time-shared basis, only one multiplier device would be required and only one switch would be required to perform the operations of the switches SWO–SW9, which switch would also be operated on a time-sharing basis to still further simplify the entire structure.

For example, considering FIG. 4, the circulating memory may be a magnetic drum B having a plurality of tracks at least equal in number to the length of the number of binary bits which comprise a tap gain value. Each bit would be stored in one of the tracks of the drum wherein the group of tracks would have the capability of a plurality of the digital signal groups equal in number to the tap gains and spaced around the drum by a distance equal to the delay period (T) between taps as described with regard to FIGS. 1 and 3, for example. A suitable write head WH(one would be provided for each track) and groups or read heads RH (one would be provided at spaced intervals from their associated write heads) for readout of the previously generated tap gains to calculate the next tap gain within the calculating sequence which would operate as follows:

Initially, before the occurrence of the signal in the receiving channel of the subscriber during a non-speech interval in the sending channel of the subscriber, a control circuit 30 would clear all tracks of the drum. The signals $R(t)$ and $R'(t)$ would be picked up at time $t_0$ and applied to the divider circuit 36 in the same manner as was previously described to form the quotient $X_0$ with regard to the embodiments of FIGS. 2 and 3. The quotient is stored by means of the write heads into the start position of the drum.

At the next succeeding time interval $(t_0+T)$ the tap gain $X_0$ will arrive at the first read head station where it will then be read out and multiplied against $R(t_0+T)$ stored in the drum to form the quantity $S(t_0+T)$, which quantity is subtracted from the signal $R'(t_0+T)$ whose output is then applied to the divider circuit to be divided by the quantity $R(t_0+T)$. The result of this division will then be written into the next storage position of the tracks to represent the quantity $X_1$.

The result of the multiplication of $R(t_0+T)X_0$ formed by the multiplier may be stored in a separate group of tracks which can be utilized in a manner similar to that set forth above for forming the summation $\Sigma(i-1)$. All of these factors may then be summed in a single summing circuit 34 coupled to the read heads of each of these tracks at each of the readout locations to form the necessary sum which is to be subtracted from the $R'(t)$ signal.

The remaining tap gains $X_2$—$X_n$ may be generated in a similar fashion wherein a suitable number of read head groups are arranged at intervals around the tracks so as to be able to read out both the tap gain values and the products of the tap gain values and the associated $R(t)$ signals for summation purposes. Whereas the use of a magnetic drum has been described hereinabove, it should be understood that any other type of electronic memory having an electronic circulating capability may be utilized.

Although there has been described a preferred embodiment of this novel invention, many variations and modifications will now be apparent to those skilled in the art. Therefore, this invention is to be limited, not by the specific disclosure herein, but only by the appending claims.

We claim:

1. An echo canceller for use in cancelling echoes due to the leakage of a signal from the receiving path of a four-wire network to the sending path of a four-wire network through a hybrid circuit connecting the receiving and sending paths of a four-wire network to a two-wire network comprising:

tapped delay line means having an input for receiving a signal present in the receive path of the four-wire network during said interval in which no sending voice signals are present and having a plurality of outputs;

a first storage means for storing the signal in the receiving path;

a plurality of adjustable tap gain circuits each coupled to an associated one of said tapped delay line means outputs for forming a product between the signal received from its associated tapped delay line output an the value of the signal stored in the tap gain circuit which is zero at the initial state, and which is the quotient signal obtained therafter;

means for summing all of the products generated by said tap gain circuits;

a difference circuit coupled to the output of said summing means and the sending path of said four-wire circuit for subtracting the output of said summing circuit from the signal in said four-wire sending path;

dividing means coupled between said difference circuit and said first storage means dividing the output of said difference circuit by the signal in thhe send path of the four-wire circuit;

selectively operable switch means coupled between said dividing means and each of said tap gain circuits for selectively coupling the output of said dividing means to each of said tap gain circuits in sequential fashion;

a control circuit including means for operating said switch means to sequentially couple the output of said dividing means to each of said tap gain circuits at predetermined substantially equal intervals of time, and including further means for detecting the occurrence of an interval during which no sending voice signals are present in the sending path of a four-wire network for coupling said first storage means to said receiving path;

the output of said difference circuit being coupled into the sending path of said four-wire network whereby the leakage signal path from the receiving path to the sending oath of said four-wire network through the hybrid circuit is cancelled to eliminate echoes present in voice signals transmitted from the subscriber through the hybrid to the send path of the four-wire circuit.

2. The apparatus of claim 1 wherein said tap gain circuits are each further comprised of register means for receiving at predetermined intervals of time the quotient developed by said dividing means;

said tap gain circuits multiplying the value, which is zero at the initial state, and is the quotient signal obtained thereafter, set therein by the signal received from its associated output of the tapped delay line and coupling the product signal formed thereby to said adding means.

3. The device of claim 1 further comprising register means coupled between said four-wire circuit receiving path and the input of said dividing means for storing the signal present in the receiving path;

second switch means coupled between said register and said receive path;

said control circuit further comprising means for selectively closing said second switch means upon the initiation of the time when the signal appears in the receiving path of the four-wire circuit for transferring said signal at the time of closure of said second switch means into said register means.

4. A method for suppressing talkers' echo which occurs in the send path of a four-wire circuit due to the leakage signal developed by a hybrid circuit coupling the send and receive paths of the four-wire circuit to a two-wire circuit comprising the steps of:

detecting the occurrence of a period during which no voice signals are present in the sending side of a four-wire network;

dividing the leakage signal then appearing in the send path of the four-wire circuit by the signal appearing in the receive path of the four-wire circuit immediately upon detection of the signal appearing in the receive path of the four-wire circuit to form a signal representative of the quotient of this division;

multiplying the quotient signal by a set of signals appearing at predetermined sequential time intervals in the receive path of the four-wire network, to thereby form product signals;

summing the product signals and subtracting this sum from the signal appearing in the send path of the four-wire network at the time the sum is formed;

sequentially forming an additional predetermined number of product signals each at a predetermined interval of time equal to said first mentioned predetermined interval of time wherein each of the additional quotients signals are formed by summing all previously formed product signals, subtracting these product signals from the value of the signal appearing in the send path at the time interval associated therewith, and dividing this difference signal so formed by the original signal appearing in the send path immediately upon initiation of the occurrence of the signal in the receiving path of the wire network;

summing all of the product signals which were derived from the associated quotient signals to thereby form a final resultant signal which is then subtracted from the signals in the send path of the four-wire circuit to eliminate talkers' echo.

5. Apparatus for eliminating talkers' echo which occurs in the send path of a four-wire circuit comprised of a send and receive path which send and receive paths are coupled to a two-wire circuit through a hybrid circuit, comprising:

first means for detecting a non-speech interval in the subscriber location;

register means comprising a first storage position for storing the value of the signal appearing in the receive path during said non-speech interval;

dividing means coupled between said register means and said four-wire circuit send path for forming quotient signals;

product generating means coupled between said register means and said four-wire circuit receive path for generating product signals;

said register means including a plurality of additional storage positions for storing each quotient signal formed at predetermined substantially equal intervals of time after the occurrence of the signal in the receiving path of the four-wire network during said non-speech interval;

summing means for summing all of the product signals at each interval of time to form a resultant sum signal;

difference circuit means for subtracting the summed signal from the signal appearing in the send path of the four-wire network to yield a difference signal for transmission whereby substantially all of talkers' echo has been eliminated.

* * * * *